US012146665B2

(12) United States Patent
Lambert et al.

(10) Patent No.: US 12,146,665 B2
(45) Date of Patent: Nov. 19, 2024

(54) ULTRASONIC FILTRATION DEVICE FOR EXTRACTOR HOOD

(71) Applicants: BSH Home Appliances Corporation, Irvine, CA (US); BSH Hausgeräte GmbH, Munich (DE)

(72) Inventors: Richard Lambert, Knoxville, TN (US); Sean Scott, Tulsa, OK (US); Derek Turner, Caryville, TN (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 584 days.

(21) Appl. No.: 17/385,964

(22) Filed: Jul. 27, 2021

(65) Prior Publication Data

US 2021/0356139 A1 Nov. 18, 2021

Related U.S. Application Data

(63) Continuation of application No. 16/693,414, filed on Nov. 25, 2019, now Pat. No. 11,125,446.

(51) Int. Cl.
*F24C 15/20* (2006.01)
*B02C 19/18* (2006.01)

(52) U.S. Cl.
CPC .......... *F24C 15/2042* (2013.01); *B02C 19/18* (2013.01); *F24C 15/2035* (2013.01)

(58) Field of Classification Search
CPC .............. F24C 15/2021; F24C 15/2035; F24C 15/2042; B02C 19/18
See application file for complete search history.

(56) References Cited

U.S. PATENT DOCUMENTS

| | | | | |
|---|---|---|---|---|
| 1,069,647 | A | 8/1913 | Robinson | |
| 5,074,281 | A | 12/1991 | Fluhrer | |
| 6,324,889 | B1 | 12/2001 | Fluhrer | |
| 6,578,569 | B2 | 6/2003 | Liese et al. | |
| 7,442,119 | B2 | 10/2008 | Fluhrer | |
| 9,212,824 | B2 | 12/2015 | Ehrensberger et al. | |
| 9,222,680 | B1 | 12/2015 | Seloff | |
| 11,125,446 | B2 * | 9/2021 | Lambert | F24C 15/2021 |
| 2002/0129809 | A1 * | 9/2002 | Liese | F24C 15/2021 126/299 R |
| 2006/0278216 | A1 * | 12/2006 | Gagas | F24C 15/2028 126/299 D |
| 2016/0279556 | A1 | 9/2016 | Law | |

FOREIGN PATENT DOCUMENTS

| | | | |
|---|---|---|---|
| CN | 2326886 | Y | 6/1999 |
| CN | 2591470 | Y | 12/2003 |
| CN | 105889999 | A | 8/2016 |
| CN | 106287887 | A | 1/2017 |
| CN | 106439960 | A | 2/2017 |
| CN | 207006289 | U | 2/2018 |

* cited by examiner

*Primary Examiner* — Alfred Basichas
(74) *Attorney, Agent, or Firm* — Michael E. Tschupp; Andre Pallapies; Brandon G. Braun

(57) ABSTRACT

An ultrasonic filtration device may be incorporated into or otherwise installed in an extractor hood in a cooking environment. The ultrasonic filtration device aids in the elimination and/or reduction of contaminants in the air produced as a byproduct of cooking. Particulate contaminants are bombarded with high-energy pressure waves, thereby breaking up the particulates and reducing their size until they are no longer noticeable and/or hazardous to the user.

10 Claims, 7 Drawing Sheets

ULTRASONIC FILTRATION DEVICE FOR EXTRACTOR HOOD

CROSS-REFERENCE TO RELATED APPLICATION

This application is a continuation, under 35 U.S.C. § 120, of U.S. application Ser. No. 16/693,414, filed Nov. 25, 2019.

FIELD

This disclosure relates to systems and methods related to air filtration devices for use in a cooking environment.

INTRODUCTION

Filters are often included in kitchen ventilation systems, utilized to reduce odors, particulates, and potentially hazardous materials, such as smoke, grease, and the like from an airstream. Filters can be particularly useful in extractor hoods situated above cooktops, as the cooking process is often a source of smoke, grease, and other particulate matter. Known filters mechanically catch and retain the particulates in question, and therefore become dirty over time. They are also cumbersome to replace and maintain. Some known filters incorporate electrostatic systems, which require a large amount of electricity and generate ozone as a byproduct of their operation. Cost effective, sustainable, low-maintenance solutions are needed for particulate elimination in kitchen ventilation systems.

SUMMARY

The present disclosure provides systems, apparatuses, and methods relating to ultrasonic filtration of an airstream in a cooking environment.

In some examples, a ventilation hood may include a canopy having an open mouth disposed above a cooking surface and an exit duct; a fan operatively connected to the canopy and configured to produce an airstream flowing through the open mouth to the exit duct; and an array of ultrasonic transducers disposed adjacent the airstream and configured to direct ultrasonic pressure waves into the airstream.

In some examples, a filtration system may include a fan disposed in a duct having an outlet, wherein the duct is coupled to a ventilation hood having an inlet, such that the fan is configured to produce an airstream flowing from the inlet to the outlet; an array of ultrasonic transducers disposed adjacent the airstream and configured to direct ultrasonic pressure waves into the airstream; and a mechanical baffle filter disposed in the airstream and configured to remove particulates from the airstream.

In some examples, a method of reducing particulate matter from a cooking environment may include generating an airflow through a ventilation hood, wherein the airflow contains particulates produced by an underlying cooktop; and bombarding the particulates in the airflow with ultrasonic sound waves configured to break up the particulates, using an array of ultrasonic transducers disposed within the ventilation hood.

Features, functions, and advantages may be achieved independently in various embodiments of the present disclosure, or may be combined in yet other embodiments, further details of which can be seen with reference to the following description and drawings.

DETAILED DESCRIPTION

Figure 1:
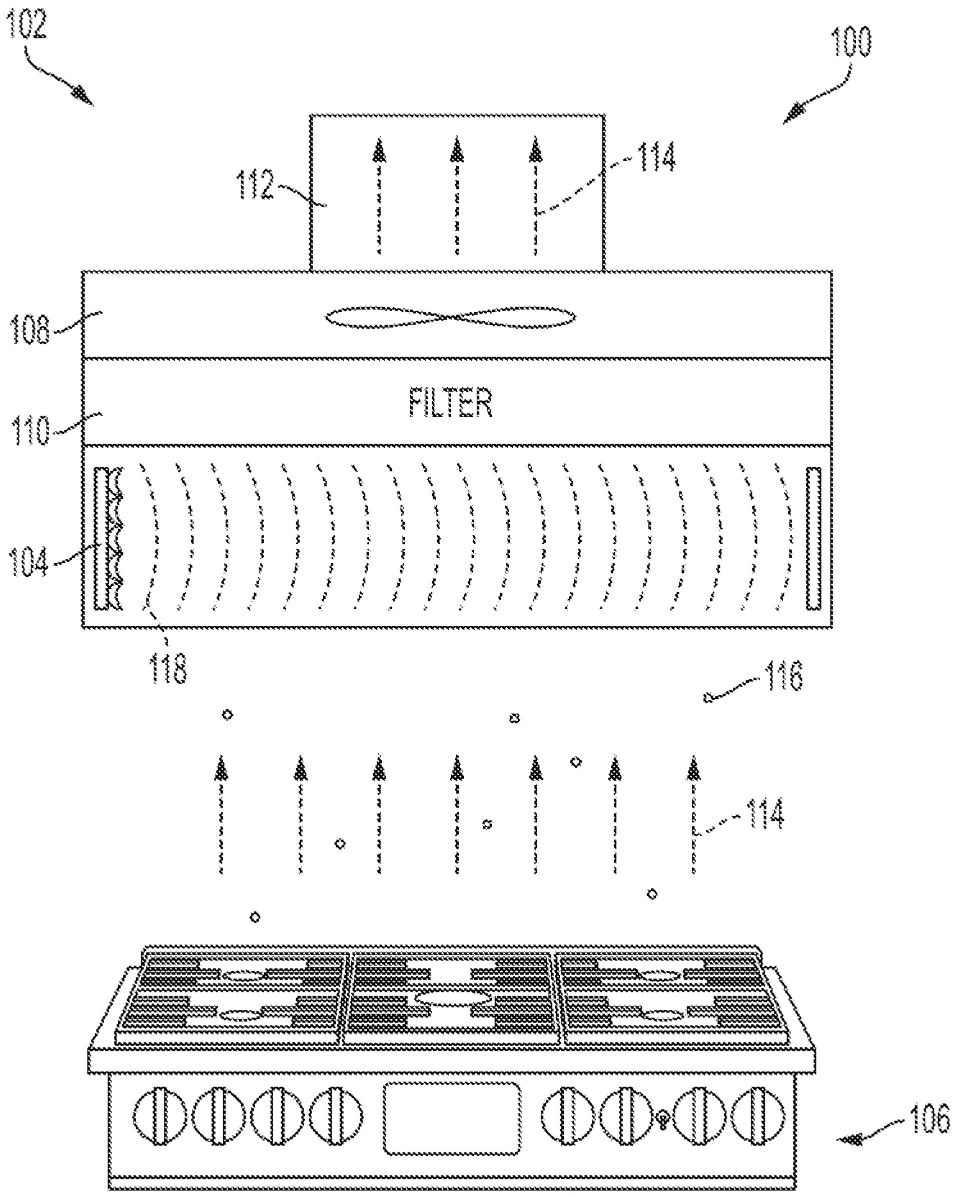
FIG. 1 is a schematic diagram of an illustrative extractor hood having an ultrasonic filtration device, in accordance with aspects of the present disclosure.

Various aspects and examples of an ultrasonic filtration device in a cooking environment, as well as related methods, are described below and illustrated in the associated drawings. Unless otherwise specified, ultrasonic filtration device in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A and B, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"Coupled" means connected, either permanently or releasably, whether directly or indirectly through intervening components.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Processing logic" means any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

"Providing," in the context of a method, may include receiving, obtaining, purchasing, manufacturing, generating, processing, preprocessing, and/or the like, such that the object or material provided is in a state and configuration for other steps to be carried out.

Overview

In general, an ultrasonic filtration device of the present disclosure bombards an airstream with high frequency acoustic pressure waves to facilitate the removal and/or destruction of smoke, grease, and other particulates. This may be particularly useful, for example, as part of a ventilation hood, such as those often used in kitchens and other cooking environments. However, the systems and methods described herein may be suitable for use in other environments, such as laboratory hoods.

Ventilation or extractor hoods generate an airstream flowing from a cooktop through the hood, typically using a rotary fan or other air moving device. As described herein, an ultrasonic filtration device may be utilized to bombard particulates and contaminants in the airstream with acoustic (ultrasonic) pressure waves. By way of direct energy transfer and/or subsequent collisions between particles or between particles and surfaces of the hood, this acoustic bombardment causes the particulates to break apart, reducing their size to unobjectionable levels.

The ultrasonic filtration device may be incorporated into an extractor hood during the manufacturing process, or may comprise an aftermarket device mountable in an existing extractor hood. Ultrasonic filtration devices of the present disclosure may work in tandem with pre-existing filtration techniques and devices (e.g., within the same ventilation hood).

Examples, Components, and Alternatives

The following sections describe selected aspects of exemplary extractor hoods having ultrasonic filtration devices, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Ultrasonic Filtration Device

As shown in FIGS. 1-8, this section describes various illustrative ultrasonic filtration devices incorporated into suitable ventilation systems and/or air purification devices. The ultrasonic filtration devices described below are examples of the ultrasonic filtration devices described in the Overview section, above.

Figure 2:
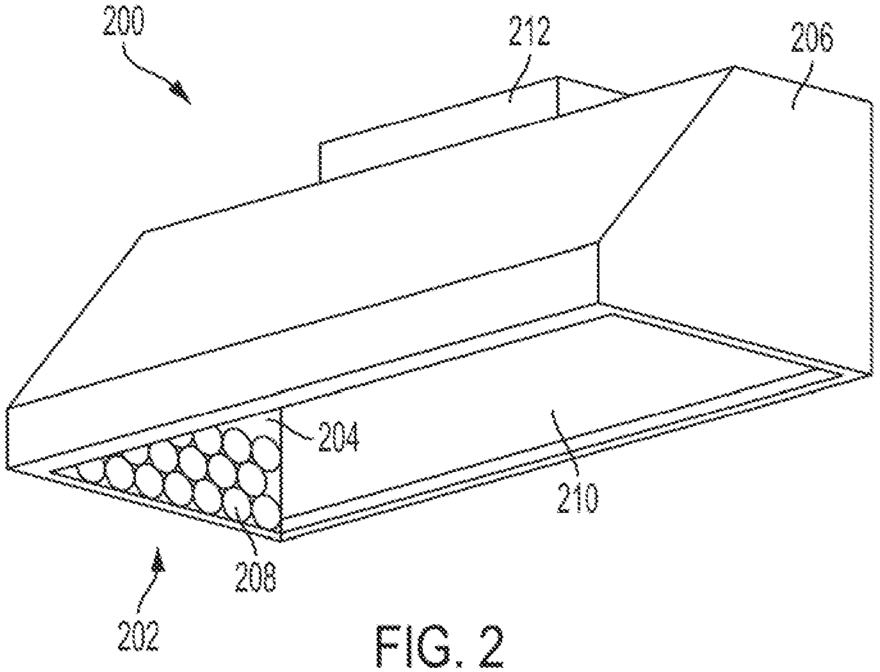
FIG. 2 is an isometric view of an illustrative extractor hood having a linear ultrasonic filtration array disposed on an inner surface of the extractor hood.
Figure 3:
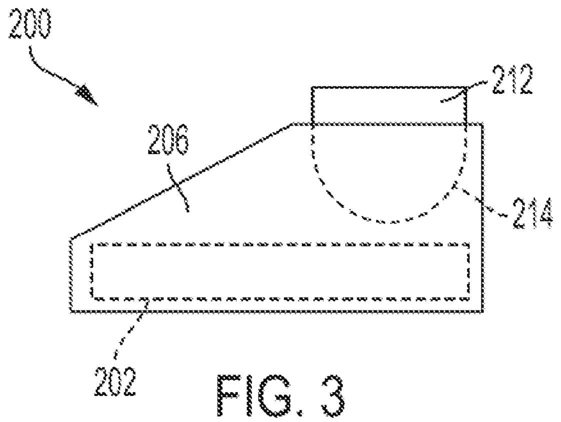
FIG. 3 is a side elevation view of the extractor hood of FIG. 2.
Figure 4:
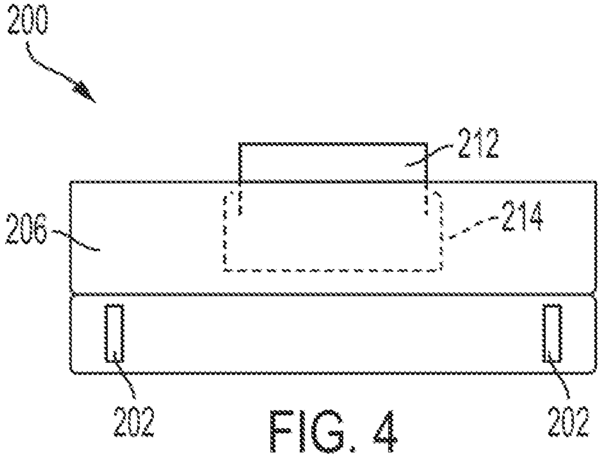
FIG. 4 is a front view of the extractor hood of FIG. 2.
Figure 5:
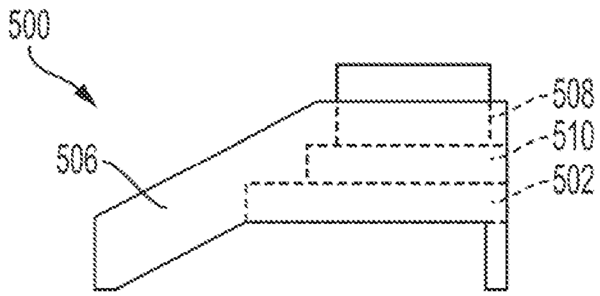
FIG. 5 is a side elevation view of an illustrative extractor hood having a circular ultrasonic filtration array disposed in a ventilation column, in accordance with aspects of the present disclosure.
Figure 6:
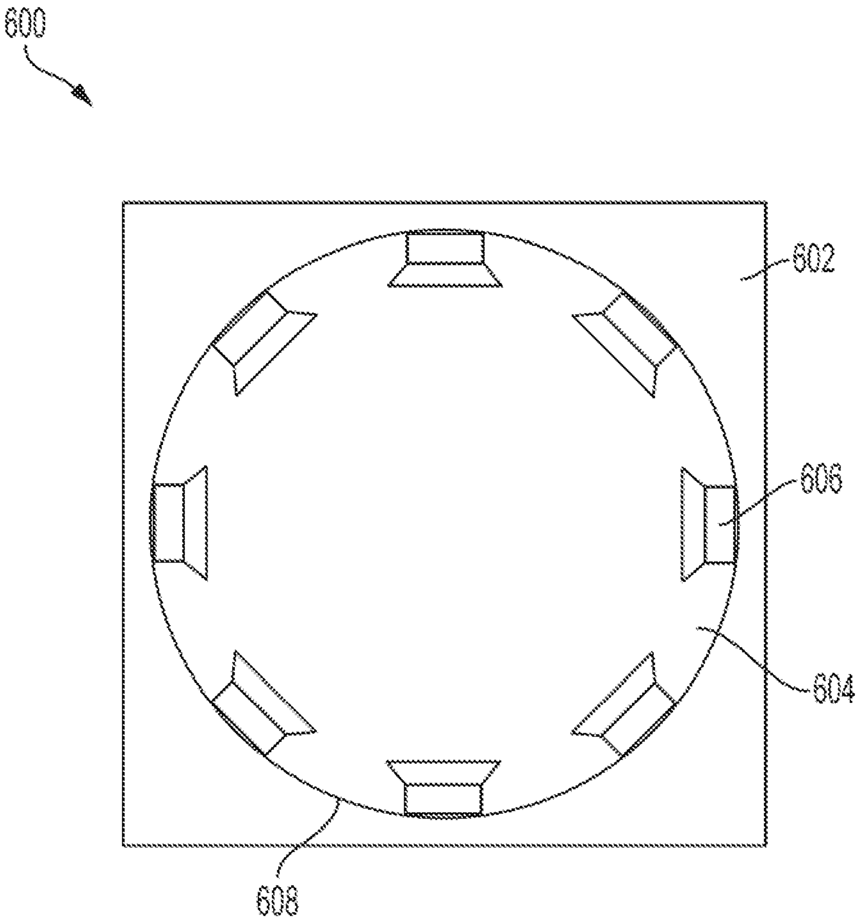
FIG. 6 is a top plan view of an illustrative circular ultrasonic filtration array suitable for use in the hood of FIG. 5.
Figure 7:
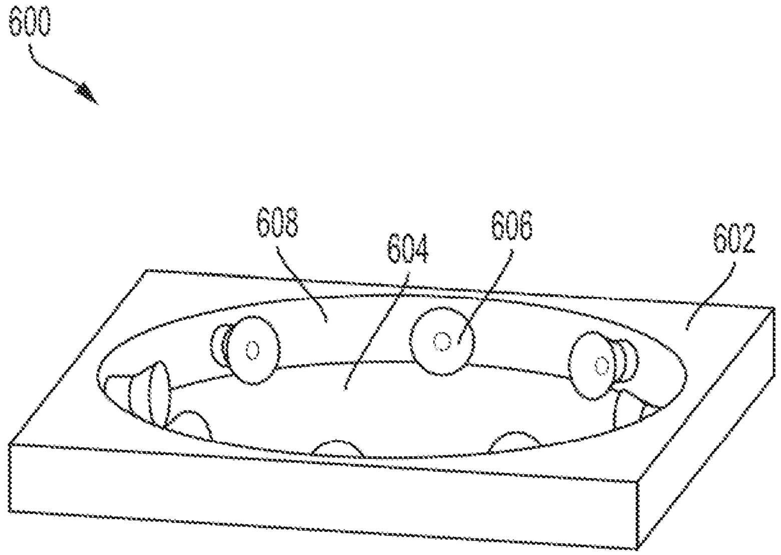
FIG. 7 is an isometric view of the array of FIG. 6.
Figure 8:
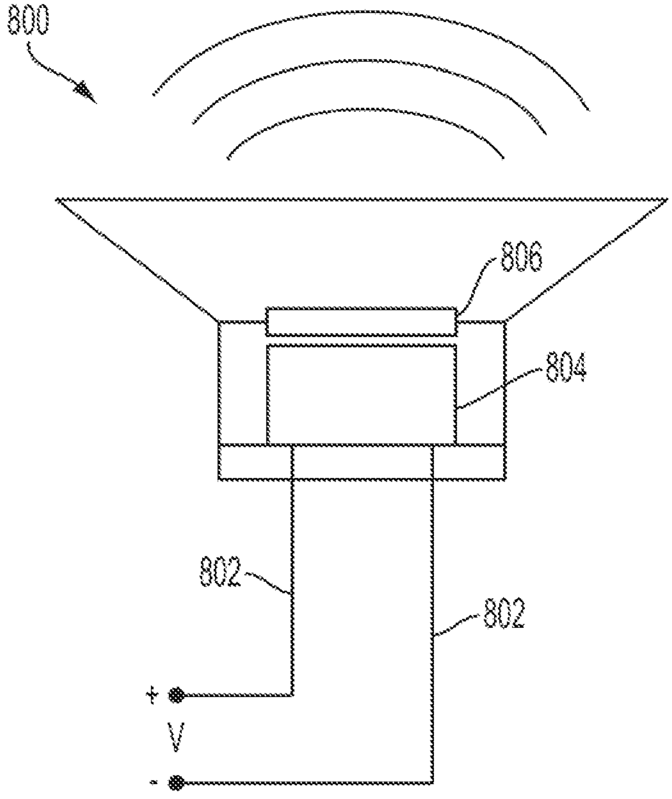
FIG. 8 is a schematic diagram of an illustrative ultrasonic transducer.

FIG. 1 is a schematic diagram of an extractor hood including an ultrasonic filtration device. FIGS. 2-4 depict another illustrative extractor hood having an ultrasonic filtration device comprising a two-dimensional linear array of ultrasonic transmitters. FIG. 5 depicts an extractor hood having an ultrasonic filtration device configured as a circular array. FIGS. 6 and 7 depict an illustrative ultrasonic filtration device suitable for use in the extractor hood of FIG. 5. FIG. 8 is a schematic diagram of an individual ultrasonic transducer suitable for use in any of the above examples.

With reference to FIG. 1, an extractor hood 100 having an ultrasonic filtration device 104 is disposed in a cooking environment 102, above a cooktop 106. The cooktop may comprise a plurality of burners, a griddle, a grill, a deep fryer, and/or the like. Extractor hood 100 may optionally include a blower or fan 108, one or more additional filtration device(s) 110 (e.g., a metal mesh filter, a baffle filter, an electrostatic filter, etc.), and/or a ductwork 112 (e.g., a chimney, and/or an exhaust outlet). Fan or blower 108 is configured to cause a movement of air (e.g., by generating a volume of low pressure) within hood 100, producing an airstream 114 that flows from cooktop 106 through hood 100 and exits via ductwork 112. In some examples, fan or blower 108 is configured to be controllable via a human-machine interface (HMI), such as a graphical user interface and/or a physical button or switch. In some examples, fan 108 is controllable automatically or semi-automatically by an electronic controller in communication with the ventilation system and/or the cooktop.

Airstream 114 contains particulate matter 116 (AKA particulates). The particulates may, for example, be residuals of cooking at high temperatures and may comprise oil droplets, smoke, water vapor, ash particles, volatile organic compounds (VOCs), and/or the like. Airstream 114 and particulates 116 flow from the vicinity of cooktop 106 toward hood 100, and flow past ultrasonic filtration device 104.

The ultrasonic filtration device comprises one or more ultrasonic acoustic transmitters (e.g., transducers) configured to output an ultra-high frequency of sound. Ultrasonic filtration device 104 is arranged, e.g., as an array, to bombard particulates 116 in airstream 114 with highly energetic sound pressure waves 118. Sound pressure waves 118 vibrate and destroy or break apart particulates 116 within airstream 114 (e.g., directly and/or by causing collisions), thereby reducing the overall size of individual particulates. Transmitters of ultrasonic filtration device 104 are configured to generate frequencies of 20,000 Hz or more. In some examples, the ultrasonic filtration device may be configured to operate at a single frequency. In some examples, the ultrasonic filtration device may be configured to operate with transmitters emitting at two or more different frequencies, e.g., simultaneously and/or selectively. Arrays of transmitters may have any suitable topology (e.g., rectangular, circular, multi-sided, etc.). In some examples, a buffer wall or a reflective surface may be disposed across from the ultrasonic transmitter array. In some examples, a second array may be disposed across from the first array.

After flowing past or through ultrasonic filtration device 104, airstream 114 and any remaining particulates 116 may pass through one or more additional filtration devices 110. Additional filtration devices 110 may include any suitable mechanical or electrostatic filter configured to remove larger particulates not broken down sufficiently by the ultrasonic filtration device. In some examples, additional filtration device 110 may comprise one or more combinations of a metal mesh filter, a baffle filter, an electrostatic filter, and/or the like.

Airstream 114 may then be vented from the extractor hood 100 via ductwork 112. In some examples, airstream 114 may be recycled back into cooking environment 102 through an exhaust outlet in extractor hood 100 and/or ductwork 112. In some examples, the airstream 114 is vented into an external environment (e.g., outside the building).

In some examples, the ultrasonic filtration device 104 may sufficiently eliminate or reduce particulates 116 from airstream 114, such that additional filtration device 110 is excluded from the system. In some examples, ultrasonic filtration device 104 may work in tandem with additional filtration techniques and/or devices. In some examples, ultrasonic filtration device 104 may be installable in a pre-existing extractor hood, thereby functioning in tandem with pre-existing filters.

In some examples, airstream 114 and particulates 116 are passed through additional filtration device 110 prior to encountering ultrasonic filtration device 104. In general, one or more ultrasonic filtration devices and one or more additional filtration devices may be physically arranged in any suitable order and combination. Ultrasonic filtration device 104 may be disposed upstream and/or downstream of fan 108. In some examples, fan 108 may be disposed external to extractor hood 100, e.g., in line with the ducting and/or exhaust outlet.

Referring now to FIGS. 2-4, an illustrative extractor hood 200 may comprise an ultrasonic filtration device 202 disposed on an interior surface 204 of an extractor hood canopy 206. Ultrasonic filtration device 202 comprises one or more ultrasonic transducers 208 configured to generate ultra-high frequency sound waves. In operation, ultrasonic transducers 208 emit ultra-high frequency sound waves into an interior cavity 210 configured to channel an airstream through the extractor hood. In some examples, an inward facing surface opposite ultrasonic transducers 208 may comprise a reverberant or buffer wall. This wall may be configured to absorb or reflect the ultra-high frequency sound waves, depending on the desired effect. In some examples, an inward facing surface opposite ultrasonic transducers 208 may comprise a complementary arrangement of ultrasonic transducers configured to further facilitate the destruction and/or removal of particulates from the airstream.

Ultrasonic transducers 208 of the example depicted in FIG. 2 are hexagonally packed to increase an effective area of the destructive ultra-high frequency sound waves. Alternative configurations of the transducers within the ultrasonic filtration device may be desirable. In some examples, ultrasonic transducers 208 may be arranged in a single row such that each ultrasonic transducer is spaced from an adjacent ultrasonic transducer. In some examples, ultrasonic transducers 208 may be arranged in multiple rows, forming a matrix. The ultrasonic transducers may be disposed on any number of interior facing surfaces of extractor hood canopy 206, a chimney 212, and/or any other suitable interior surface of the hood. In some examples, it may be beneficial to have two or more ultrasonic transducer arrays on opposing interior facing surfaces (e.g. front and back, or left and right). In some examples, it may be beneficial to have respective arrays of ultrasonic transducers on all interior facing surfaces.

With reference to FIGS. 3 and 4, a blower 214 is attached to chimney 212, both components being disposed at a central rear portion of extractor hood 200. Ultrasonic filtration device 202 may have a depth corresponding to the depth of extractor hood 200. Extractor hood 200 and internal components, such as ultrasonic filtration device 202 and blower 214 may be generally coaxial.

With reference to FIG. 5, an illustrative extractor hood 500 may comprise a hood canopy 506 containing an ultrasonic filtration device 502, a mechanical or other filtration device 510, and a fan 508 stacked upon one another in a ventilation column. In this example, ultrasonic filtration device 502 is disposed at the bottom of the column, other filtration device 510 as the middle component in the column, and fan 508 as the topmost component of the column. However, the two or more components may be stacked interchangeably, depending on operating conditions and desired effect.

FIGS. 6 and 7 depict a circular ultrasonic filtration device 600 suitable for use in the extractor hood of FIG. 5. Ultrasonic filtration device 600 comprises a housing 602 with a circular cutout 604 and eight ultrasonic transducers 606. The ultrasonic transducers are mounted to an inner surface 608 of housing 602 at approximately 45-degree intervals. The number and placement of the ultrasonic transducers may be adjusted to meet a desired effect. In some examples, ultrasonic filtration device 600 may comprise two or more rows of ultrasonic transducers with uniform or non-uniform spacing between individual transducers.

FIG. 8 is a schematic diagram of an illustrative ultrasonic transducer 800 suitable for use with the systems described herein. Ultrasonic transducer 800 is configured to convert an electrical signal carried by a conductor 802 into acoustical pressure waves having an ultrasonic frequency (i.e., greater than approximately 20 kHz). Ultrasonic transducer 800 comprises a piezoelectric crystal 804 coupled to a diaphragm 806. When a varying electrical signal is applied, piezoelectric crystal 804 vibrates in response, which in turn causes diaphragm 806 to contract and expand. The movement of diaphragm 806 creates pressure waves in a surrounding medium. The rate at which the piezoelectric crystal vibrates is proportional to the voltage applied and depends on the specific makeup of the piezoelectric crystal.

The numbered paragraphs below describe additional aspects and features of an ultrasonic filtration system:

A0. A ventilation hood comprising:
- a canopy having an open mouth disposed above a cooking surface and an exit duct;
- a fan operatively connected to the canopy and configured to produce an airstream flowing through the open mouth to the exit duct; and
- an array of ultrasonic transducers disposed adjacent the airstream and configured to direct ultrasonic pressure waves into the airstream.

A1. The ventilation hood of A0, wherein the array of ultrasonic transducers comprises a circular array disposed coaxially with the exit duct.

A2. The ventilation hood of A0, wherein the array of ultrasonic transducers comprises a first array disposed on a first interior surface of the canopy.

A3. The ventilation hood of A2, wherein the array of ultrasonic transducers further comprises a second array disposed on a second interior surface of the canopy.

A4. The ventilation hood of A3, wherein the first interior surface is opposite the second interior surface.

A5. The ventilation hood of any one of paragraphs A0 and A2 through A4, further comprising a reflective surface disposed opposite the array of ultrasonic transducers.

A6. The ventilation hood of any one of paragraphs A0 through A5, wherein each transducer of the array of ultrasonic transducers is configured to emit sound waves at a frequency greater than 20 kiloHertz (kHz).

A7. The ventilation hood of any one of paragraphs A0 through A6, wherein each transducer of the array of ultrasonic transducers is configured to emit sound waves at an intensity of at least 100 decibels (dB).

B0. A filtration system comprising:

a fan disposed in a duct having an outlet, wherein the duct is coupled to a ventilation hood having an inlet, such that the fan is configured to produce an airstream flowing from the inlet to the outlet;

an array of ultrasonic transducers disposed adjacent the airstream and configured to direct ultrasonic pressure waves into the airstream; and a mechanical baffle filter disposed in the airstream and configured to remove particulates from the airstream.

B1. The system of B0, wherein the array of ultrasonic transducers comprises a circular array disposed coaxially with the duct.

B2. The system of B0, wherein the array of ultrasonic transducers comprises a first array disposed on a first interior surface of the ventilation hood.

B3. The system of B2, wherein the array of ultrasonic transducers further comprises a second array disposed on a second interior surface of the ventilation hood.

B4. The system of B3, wherein the first interior surface is opposite the second interior surface.

B5. The system of any one of paragraphs B0 and B2 through B4, further comprising a reflective surface disposed opposite the array of ultrasonic transducers.

B6. The system of any one of paragraphs B0 through B5, wherein each transducer of the array of ultrasonic transducers is configured to emit sound waves at a frequency greater than 20 kiloHertz (kHz).

B7. The system of any one of paragraphs B0 through B6, wherein each transducer of the array of ultrasonic transducers is configured to emit sound waves at an intensity of at least 100 decibels (dB).

B. Illustrative Method

Figure 9:
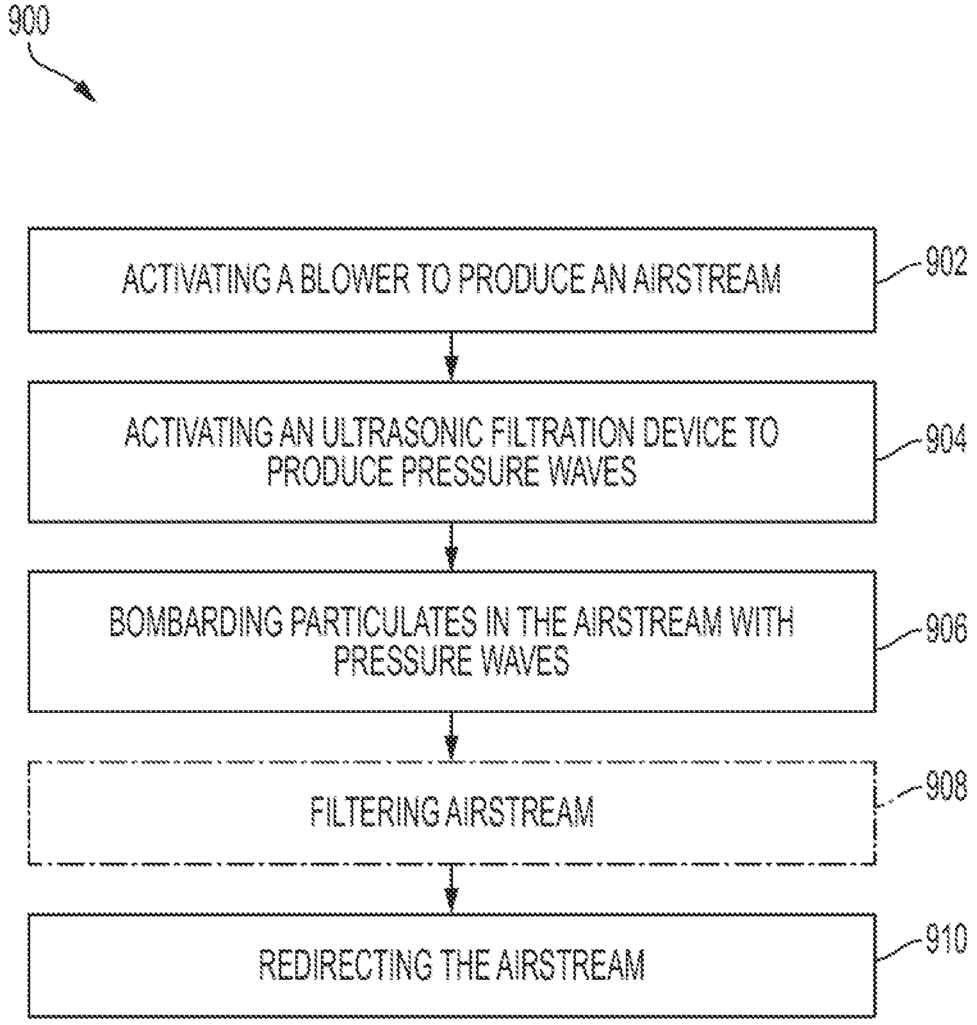
FIG. 9 is a is a flow chart depicting steps of an illustrative method for reducing particulates in an airstream according to the present teachings.

This section describes steps of an illustrative method 900 for reducing or eliminating particulates from a cooking environment; see FIG. 9. Aspects of hoods 100, 200, and 500 and related devices may be utilized in the method steps described below. Where appropriate, reference may be made to components and systems that may be used in carrying out each step. These references are for illustration, and are not intended to limit the possible ways of carrying out any particular step of the method.

FIG. 9 is a flowchart illustrating steps performed in an illustrative method, and may not recite the complete process or all steps of the method. Although various steps of method 900 are described below and depicted in FIG. 9, the steps need not necessarily all be performed, and in some cases may be performed simultaneously or in a different order than the order shown.

Step 902 of method 900 includes activating an air moving device, such as a fan or blower, in a kitchen ventilation hood, such that an airstream is caused to flow from a region near a cooktop through the hood. Activation or actuation of the air moving device may include manual initiation by way of a human machine interface (e.g., using a pushbutton or switch). In some examples, activation of the air moving device and potential subsequent changes in air flow may be conducted automatically or semi-automatically by an electronic controller (e.g., using processing logic thereof).

Step 904 of method 900 includes activating an ultrasonic filtration device disposed within the ventilation hood and configured to transmit acoustic pressure waves into the airstream flowing through the hood. The ultrasonic filtration device includes one or more ultrasonic transducers configured to produce high-energy ultrasonic pressure waves. The ultrasonic transducers are configured to operate at frequencies of 20,000 Hz or higher, and at intensity or power levels adequate to break apart some or all of the expected particulate matter in the airstream. For example, the ultrasonic transducers may be configured to operate at 100 decibels (dB) or more. In some examples, the ultrasonic transducers may be configured to operate at 120 decibels (dB) or more. In some examples, the ultrasonic transducers may be configured to operate at 140 decibels (dB) or more.

Step 906 of method 900 includes bombarding particulates entrained in the airstream using the output of the ultrasonic filtration device. Airstream particulates may include contaminants, such as smoke, grease, and/or food particles. The high frequency pressure waves break apart and destroy the particulate material, generally reducing the overall size of individual particles until they are small enough to no longer be noticeable.

Step 908 of method 900 includes optionally directing the airstream through an additional filtration device before and/or after the ultrasonic bombardment of step 906. This additional filtration device may be configured to remove larger particulates that may be difficult to break down completely using the ultrasonic filtration device. For example, the additional filtration device may comprise one or more of a metal mesh filter, a baffle filter, and/or an electrostatic filter.

Step 910 of method 900 includes redirecting the filtered airstream out of the extractor hood. In some examples, this may include recycling the filtered airstream back into the cooking environment. In some examples, this may include venting the airstream an environment external to the cooking environment (e.g., outdoors through an exhaust vent of the building ventilation system).

The numbered paragraphs below describe additional aspects and features of an ultrasonic filtration method:

C0. A method of reducing particulate matter from a cooking environment, the method comprising:

generating an airflow through a ventilation hood, wherein the airflow contains particulates produced by an underlying cooktop; and bombarding the particulates in the airflow with ultrasonic sound waves configured to break up the particulates, using an array of ultrasonic transducers disposed within the ventilation hood.

C1. The method of C0, further comprising: exhausting the airflow to an outdoor environment.

C2. The method of any one of paragraphs C0 through C1, further comprising: recirculating the airflow into the cooking environment.

C3. The method of any one of paragraphs C0 through C2, wherein the array of ultrasonic transducers surrounds the airflow on all lateral sides.

C4. The method of C3, wherein the array of ultrasonic transducers is circular.

C5. The method of C0, wherein the array of ultrasonic transducers includes a first array disposed on an interior wall of the ventilation hood.

C6. The method of C5, wherein the array of ultrasonic transducers includes a second array disposed on an opposing interior wall of the ventilation hood.

C7. The method of any one of paragraphs C0 through C6, further comprising: passing the airflow through a mechanical filter.

C8. The method of C7, wherein the airflow is passed through the mechanical filter before the particulates are bombarded with the ultrasonic sound waves.

C9. The method of any one of paragraphs C0 through C8, wherein the ultrasonic sound waves have a frequency greater than 20 kHz.

C10. The method of any one of paragraphs C0 through C9, wherein the ultrasonic sound waves have an intensity of at least 100 dB.

Advantages, Features, and Benefits

The different embodiments and examples of the ultrasonic filtration device described herein provide several advantages over known solutions for removing and/or eliminating smoke, grease, and/or particulates from a cooking environment. For example, illustrative embodiments and examples described herein allow for a filtration device that does not require periodic cleaning and/or replacement.

Additionally, and among other benefits, illustrative embodiments and examples described herein allow for removal and/or elimination of smoke, grease, and/or particulates from an airstream without incurring additional noise.

Additionally, and among other benefits, illustrative embodiments and examples described herein allow the ultrasonic filtration device to be installable within pre-existing kitchen ventilation systems and/or work in tandem with filtration systems currently known in the art, increasing the longevity of existing components and systems.

Additionally, and among other benefits, illustrative embodiments and examples described herein do not produce ozone.

Additionally, and among other benefits, illustrative embodiments and examples described herein do not utilize disposable parts (e.g., mesh filters).

Additionally, and among other benefits, illustrative embodiments and examples described herein have low energy requirements, and are silent to operate.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A ventilation hood comprising:

a canopy having an open mouth disposed above a cooking surface and an exit duct;

a fan operatively connected to the canopy and configured to produce an airstream flowing through the open mouth to the exit duct;

an array of ultrasonic transducers disposed adjacent the airstream and configured to direct ultrasonic pressure waves into the airstream, and a reflective surface disposed opposite the array of ultrasonic inducers.

2. The ventilation hood of claim 1, wherein the array of ultrasonic transducers comprises a first array disposed on a first interior surface of the canopy.

3. The ventilation hood of claim 2, wherein the array of ultrasonic transducers further comprises a second array disposed on a second interior surface of the canopy.

4. The ventilation hood of claim 3, wherein the first interior surface is opposite the second interior surface.

5. The ventilation hood of claim 1, wherein each transducer of the array of ultrasonic transducers is configured to emit sound waves at a frequency greater than 20 kiloHertz (kHz).

6. The ventilation hood of claim 1, wherein each transducer of the array of ultrasonic transducers is configured to emit sound waves at an intensity of at least 100 decibels (dB).

7. A filtration system comprising:

a fan disposed in a duct having an outlet, wherein the duct is coupled to a ventilation hood having an inlet, such that the fan is configured to produce an airstream flowing from the inlet to the outlet;

an array of ultrasonic transducers disposed adjacent the airstream and configured to direct ultrasonic pressure waves into the airstream;

a mechanical baffle filter disposed in the airstream and configured to remove particulates from the airstream, and a reflective surface disposed opposite the array of ultrasonic transducers.

8. The system of claim 7, wherein the array of ultrasonic transducers comprises a first array disposed on a first interior surface of the ventilation hood.

9. The system of claim 8, wherein the array of ultrasonic transducers further comprises a second array disposed on a second interior surface of the ventilation hood.

10. The system of claim 8, wherein each transducer of the array of ultrasonic transducers is configured to emit sound waves at an intensity of at least 100 decibels (dB).

* * * * *